(12) United States Patent
Asai

(10) Patent No.: US 8,639,367 B2
(45) Date of Patent: Jan. 28, 2014

(54) SUBSTRATE PROCESSING SYSTEM

(75) Inventor: Kazuhide Asai, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 344 days.

(21) Appl. No.: 12/873,413

(22) Filed: Sep. 1, 2010

(65) Prior Publication Data

US 2011/0071661 A1 Mar. 24, 2011

(30) Foreign Application Priority Data

Sep. 24, 2009 (JP) ................................ 2009-218709

(51) Int. Cl.
*G05B 13/02* (2006.01)
*G05B 15/00* (2006.01)
*G05B 23/02* (2006.01)
*G06F 11/30* (2006.01)
*G06F 19/00* (2011.01)
*G08B 21/00* (2006.01)
*G08B 23/00* (2006.01)

(52) U.S. Cl.
USPC ............... 700/83; 700/51; 700/95; 700/109; 700/110; 700/117; 700/121; 700/182; 340/3.32; 340/3.7; 340/500; 340/679; 702/182

(58) Field of Classification Search
USPC ............... 700/51, 83, 95, 109, 110, 117, 121, 700/182; 340/3.32, 3.7, 500, 679; 702/182; 706/914
See application file for complete search history.

(56) References Cited

U.S. PATENT DOCUMENTS

| 6,123,983 | A * | 9/2000 | Smith et al. ..................... 427/10 |
| 6,820,036 | B2 * | 11/2004 | Kitamura et al. ............. 702/182 |
| 7,346,412 | B2 * | 3/2008 | Tokorozuki et al. .......... 700/110 |
| 2008/0188973 | A1 * | 8/2008 | Filev et al. ..................... 700/110 |
| 2009/0292387 | A1 * | 11/2009 | Funakoshi ..................... 700/110 |
| 2012/0078574 | A1 * | 3/2012 | Slates ........................... 702/179 |

FOREIGN PATENT DOCUMENTS

WO 2005/045907 5/2005

* cited by examiner

*Primary Examiner* — Mohammad Ali
*Assistant Examiner* — Jennifer L Norton
(74) *Attorney, Agent, or Firm* — Brundidge & Stanger, P.C.

(57) ABSTRACT

Provided is a substrate processing system, which comprises a plurality of substrate processing apparatuses configured to process a substrate; and a group management apparatus configured to connect and manage the plurality of substrate processing apparatuses, wherein the group management apparatus includes: a communication part configured to transmit and receive data to and from the plurality of substrate processing apparatuses; a first storage part configured to store the data transmitted through the communication part from the plurality of substrate processing apparatuses; a second storage part configured to store a file prescribing a condition for determining an abnormality of the plurality of substrate processing apparatuses from the data; a display part including a manipulation screen for inputting the condition for determining the abnormality using the data stored in the first storage part or the file stored in the second storage part; a screen control part configured to control the display part to change an abnormality item selection screen displaying a plurality of abnormality items, one of which is to be selected into a registration screen for registering the condition corresponding to one of the plurality of abnormality items selected through the abnormality item selection screen; and a determination part configured to determine the abnormality of the plurality of substrate processing apparatuses by reading from the second storage part and analyzing the data stored in the first storage part based on the condition for determining the abnormality.

9 Claims, 14 Drawing Sheets

Fig. 11

| CONTENTS REGISTRATION | | LINK TABLE OF ABSTRACT NAMES OF MONITOR DATA | | | Copy |
|---|---|---|---|---|---|

DESIGNATION OF ABSTRACT NAMES OF MONITOR DATA

| NO. | NAMES OF MONITOR DATA | EQ01 | EQ02 | EQ03 | EQ04 |
|---|---|---|---|---|---|
| 1 | TEMPERATURE | --- | --- | --- | --- |
| 2 | PRESSURE | VG13 | | VG13 | VG13 |
| 3 | ClF3 | MFC13 | | MFC13 | MFC13 |
| 4 | SiH4 | MFC05 | | MFC05 | MFC05 |
| 5 | O2 | MFC12 | MFC03 | MFC12 | MFC12 |
| 6 | DEGREE OF APC OPENING | APC VALVE | | APC VALVE | APC VALVE |
| 7 | COOLING WATER PRESSURE | M.WAT(CH21) | | M.WAT(CH22) | |

SUBSTRATE PROCESSING SYSTEM

CROSS-REFERENCE TO RELATED PATENT APPLICATION

This U.S. non-provisional patent application claims priority under 35 U.S.C. §119 of Japanese Patent Application No. 2009-218709, filed on Sep. 24, 2009, in the Japanese Patent Office, the entire contents of which are hereby incorporated by reference.

BACKGROUND OF THE INVENTION

1. Field of the Invention

The present invention relates to a substrate processing system.

2. Description of the Prior Art

In the field of substrate processing technology, a group management system configured to inspect a production history or an operation state of a substrate processing apparatus is being used, and research for improving the production efficiency of a substrate processing apparatus is being carried out. In addition, accumulated apparatus monitor data is statistically analyzed to check the soundness of a substrate processing apparatus, and an alarm is actuated when an abnormality is detected, so as to prevent production of defective products.

In the conventional art, it is necessary as an up-front work for an abnormality detection function to register in advance monitor data used for determining an abnormality, or to register in advance a condition corresponding to the monitor data (such as a segmentation period of the monitor data) as equipment engineering (EE) contents (where the equipment engineering is an inventive approach for improving productivity of substrate processing apparatuses), but monitor data names are indistinguishable from each other because of various types of data of a substrate processing apparatus and an unfamiliar English notation, and thus, it may be difficult for a technician of a device maker to register monitor data or a condition corresponding to the monitor data, and it may take a long time to register monitor data or a condition corresponding to the monitor data. Furthermore, even when monitor data or a condition corresponding to the monitor data is registered, registered contents may be insufficient, and thus, an abnormality may be inappropriately detected. Therefore, a technician of an apparatus maker of a function supply source frequently takes care of a registration operation, and costs are increased and time is lost between a technician of a device maker and a technician of an apparatus maker.

SUMMARY OF THE INVENTION

An object of the present invention is to provide a substrate processing system that can easily and accurately register an abnormality detection condition.

According to an aspect of the present invention, there is provided a substrate processing system comprising: a plurality of substrate processing apparatuses configured to process a substrate; and a group management apparatus configured to connect and manage the plurality of substrate processing apparatuses, wherein the group management apparatus includes: a communication part configured to transmit and receive a monitor data to and from the plurality of substrate processing apparatuses; a first storage part configured to store the monitor data transmitted through the communication part from the plurality of substrate processing apparatuses; a second storage part configured to store a file prescribing a condition for determining an abnormality of the plurality of substrate processing apparatuses from the monitor data; a display part including a manipulation screen for inputting the condition for determining the abnormality using the monitor data stored in the first storage part or the file stored in the second storage part; a screen control part configured to control the display part to change a abnormality item selection screen displaying a plurality of abnormality items, one of which is to be selected into a registration screen for registering the condition corresponding to at least one of the plurality of abnormality items selected through the abnormality item selection screen; and a control part configured to determine the abnormality of the plurality of substrate processing apparatuses by reading from the second storage part and analyzing the monitor data stored in the first storage part based on the condition for determining the abnormality, wherein the control part is configured to display: an ID of the condition for determining the abnormality; one of the plurality of substrate processing apparatuses having the condition for determining the abnormality; and an EDIT button for editing the condition for determining the abnormality at least on the abnormality item selection screen, and is configured to perform an editing of the condition for determining the abnormality on the manipulation screen when the EDIT button is pressed with the condition for determining the abnormality selected, wherein the screen control part is configured to control the display part to change the abnormality item selection screen to the registration screen displaying an END EDIT button, a MONITOR DATA button and a STEP button when the EDIT button displayed on the abnormality item selection screen is pressed, wherein the control part is configured to allow an editing of the monitor data referred to on the registration screen in case of the abnormality by displaying a link table linking an abstract name and a channel number of the monitor data for each of the plurality of substrate processing apparatuses when the MONITOR DATA button displayed on the registration screen is pressed and is configured to allow a registration of a step indicated as the abstract name for each of the plurality of substrate processing apparatuses and a step number for a step name on the registration screen when the STEP button is pressed, and wherein the screen control part is configured to terminate the editing of the condition and change the registration screen into the abnormality item selection screen when the EDIT button is pressed.

According to another aspect of the present invention, there is provided a method of determining an abnormality of a plurality of substrate processing apparatuses executed in a group management apparatus including a communication part configured to transmit and receive a monitor data to and from the plurality of substrate processing apparatuses; a first storage part configured to store the monitor data transmitted through the communication part from the plurality of substrate processing apparatuses; a second storage part configured to store a file prescribing a condition for determining an abnormality of the plurality of substrate processing apparatuses from the monitor data; a display part including a manipulation screen for inputting the condition for determining the abnormality using the monitor data stored in the first storage part or the file stored in the second storage part; a screen control part configured to control the display part to change an abnormality item selection screen displaying a plurality of abnormality items, one of which is to be selected into a registration screen for registering the condition corresponding to at least one of the plurality of abnormality items selected through the abnormality item selection screen; and a control part configured to determine the abnormality of the plurality of substrate processing apparatuses by reading from the second storage part and analyzing the data stored in the first storage part based on the condition for determining the abnormality, the method comprising: (a) registering the condition in advance; and (b) obtaining the monitoring data, statistically processing the monitoring data, comparing the monitoring data with predetermined upper and lower limits to determine an abnormality of the monitoring data based on the condition, wherein the step (a) comprises: displaying an ID of the condition for determining the abnormality; one of the plurality of substrate processing apparatuses having the condition for determining the abnormality; and an EDIT button for editing the condition for determining the abnormality of on at least the abnormality item selection screen; changing the abnormality item selection screen to the registration screen displaying an END EDIT button, a MONITOR DATA button and a STEP button when the EDIT button displayed on the abnormality item selection screen is pressed; displaying a link table linking an abstract name and a channel number of the monitor data for each of the plurality of substrate processing apparatus when the MONITOR DATA button displayed on the registration screen is pressed to edit the monitor data referred to on the registration screen in case of the abnormality; registering a step indicated as the abstract name for each of the plurality of substrate processing apparatuses and a step number for a step name on the registration screen when the STEP button is pressed; and terminating an editing of the condition and changing the registration screen into the abnormality item selection screen when the EDIT button is pressed.

According to another aspect of the present invention, there is provided a group management apparatus comprising: a communication part configured to transmit and receive a monitor data to and from a plurality of substrate processing apparatuses; a first storage part configured to store the monitor data transmitted through the communication part from the plurality of substrate processing apparatuses; a second storage part configured to store a file prescribing a condition for determining an abnormality of the plurality of substrate processing apparatuses from the monitor data; a display part including a manipulation screen for inputting the condition for determining the abnormality using the monitor data stored in the first storage part or the file stored in the second storage part; a screen control part configured to control the display part to change a abnormality item selection screen displaying a plurality of abnormality items, one of which is to be selected into a registration screen for registering the condition corresponding to at least one of the plurality of abnormality items selected through the abnormality item selection screen; and control part configured to determine the abnormality of the plurality of substrate processing apparatuses by reading from the second storage part and analyzing the monitor data stored in the first storage part based on the condition for determining the abnormality, wherein the control part is configured to display: an ID of the condition for determining the abnormality; one of the plurality of substrate processing apparatuses having the condition for determining the abnormality, and an EDIT button for editing the condition for determining the abnormality on at least the abnormality item selection screen, and is configured to perform an editing of the condition for determining the abnormality on the manipulation screen when the EDIT button is pressed with the condition for determining the abnormality selected, wherein the screen control part is configured to control the display pan to change the abnormality item selection screen to the registration screen displaying an END EDIT button, a MONITOR DATA button and a STEP button when the EDIT button displayed on the abnormality item selection screen is pressed, wherein the control part is configured to allow an editing of the monitor data referred to on the registration screen in case of the abnormality by displaying a link table linking an abstract name and a channel number of the monitor data for each of the plurality of substrate processing apparatuses when the MONITOR DATA button displayed on the registration screen is pressed, and is configured to allow a registration of a step indicated as the abstract name for each of the plurality of substrate processing apparatuses and a step number for a step name on the registration screen when the STEP button is pressed, and wherein the screen control part is configured to terminate the editing of the condition and change the registration screen into the abnormality item selection screen when the EDIT button is pressed.

BRIEF DESCRIPTION OF THE DRAWINGS

FIG. 11 is a screen illustrating a link table of an abstract name of monitor data with a channel number in the substrate processing system according to the embodiment of the present invention.

DETAILED DESCRIPTION OF THE PREFERRED EMBODIMENTS

Figure 1:
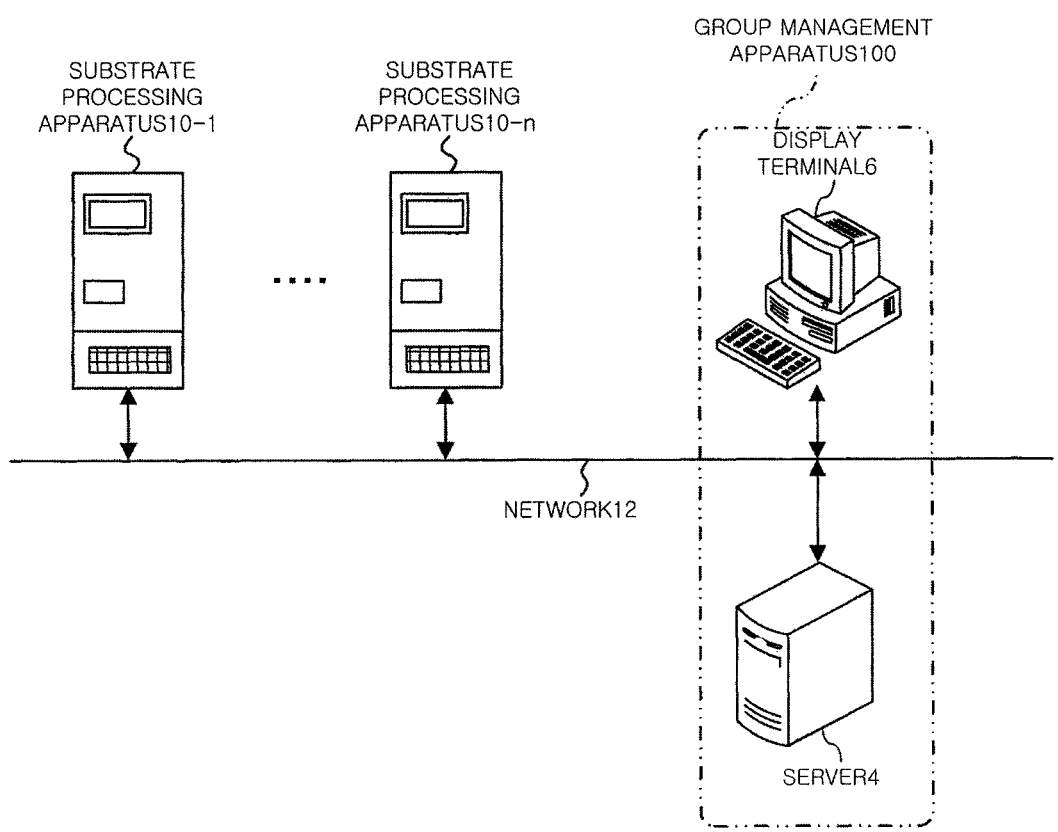
FIG. 1 is a schematic view illustrating a configuration of a substrate processing system according to an embodiment of the present invention.

FIG. 1 is a schematic view illustrating a configuration of a substrate processing system 2 according to an embodiment of the present invention.

As shown in FIG. 1, the substrate processing system 2 includes a plurality of substrate processing apparatuses 10-1 through 10-n (when a single substrate processing apparatus is used, the substrate processing apparatus is denoted by reference numeral 10) and a group management apparatus 100. The substrate processing apparatuses 10-1 through 10-n are connected to the group management apparatus 100, for example, through a network 12 such as a local area network (LAN). Thus, data is transmitted and received through the network 12 between the substrate processing apparatuses 10-1 through 10-n and the group management apparatus 100.

The group management apparatus 100 includes a server 4 and a display terminal 6 that are connected to each other through the network 12.

The substrate processing apparatus 10 is configured, for example, as a semiconductor manufacturing apparatus used to perform a processing process in a method of manufacturing a semiconductor device (integrated circuit (IC)). In addition, in the following description, as a substrate processing apparatus, a vertical apparatus configured to perform a process such as an oxidation, diffusion, or chemical vapor deposition (CVD) process on a substrate will be described.

Figure 2:
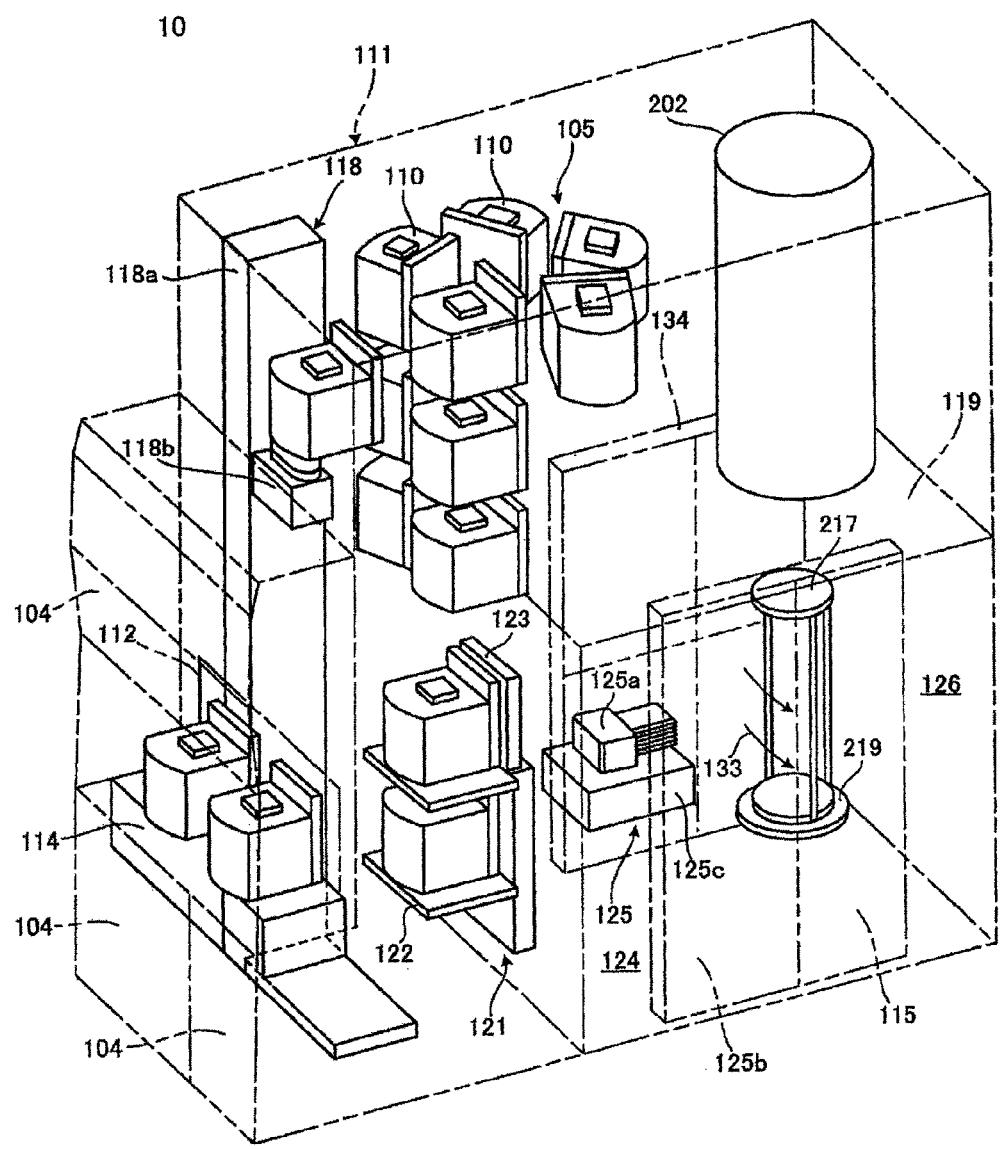
FIG. 2 is a perspective view illustrating a substrate processing apparatus according to the embodiment of the present invention.

FIG. 2 is a perspective view illustrating the substrate processing apparatus 10 according to an embodiment of the present invention.

Figure 3:
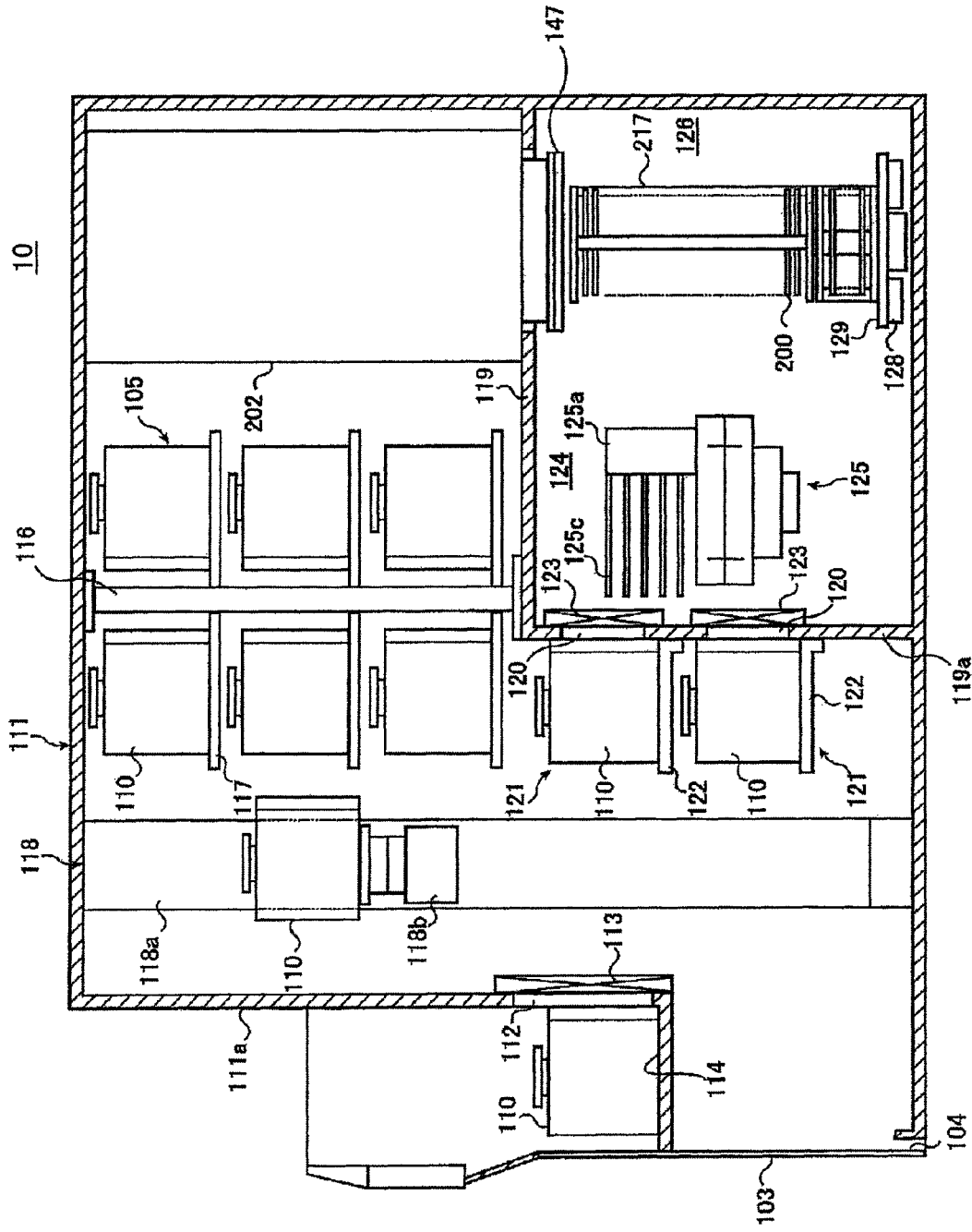
FIG. 3 is a side cross-sectional view illustrating the substrate processing apparatus according to the embodiment of the present invention.

FIG. 3 is a side cross-sectional view illustrating the substrate processing apparatus 10 as shown in FIG. 2.

As shown in FIG. 2 and FIG. 3, the substrate processing apparatus 10 according to the current embodiment of the present invention, in which FOUPs (front opening unified pods) (substrate containers, hereinafter referred to as pods) 110 are used as wafer carriers configured to accommodate wafers (substrates) 200 made of a material such as silicon, includes a housing 111. At the front side of a front wall 111a of the housing 111, a front maintenance entrance 103 is formed as an opening for maintenance, and front maintenance doors 104 are respectively installed to open and close the front maintenance entrance 103.

At the front wall 111a of the housing 111, a pod carrying entrance (substrate container carrying entrance) 112 is formed to connect the inside and outside of the housing 111, and thus, the pod carrying entrance 112 is configured to be opened and closed by a front shutter (substrate container carrying entrance opening/closing mechanism) 113. At the front side of the pod carrying entrance 112, a load port (substrate container transfer stage) 114 is installed, so that the pods 110 are placed on the load port 114 and adjusted in position. The pods 110 are configured to be carried onto the load port 114 and be carried out of the load port 114 by an in-process carrying device (not shown).

Near the upper center part of the inside of the housing 111 in a front-to-back direction, a rotary pod shelf (substrate container shelf) 105 is installed to store a plurality of pods 110. That is, the rotary pod shelf 105 includes a post 116 which is vertically installed and is intermittently rotated on a horizontal plane, and a plurality of shelf plates (substrate container stages) 117 which are radially supported at upper, middle, and lower positions of the post 116, so that the shelf plates 117 each is configured to hold a plurality of pods 110 in the state where the pods 110 are placed on each of the shelf plates 117.

Between the load port 114 and the rotary pod shelf 105 inside the housing 111, a pod carrying device (substrate container carrying device) 118 is installed. The pod carrying device 118 includes a pod elevator (substrate container elevating mechanism) 118a capable of moving upward and downward while holding a pod 110, and a pod carrying mechanism (substrate container carrying mechanism) 118b as a carrying mechanism, so that the pod carrying device 118 is configured to carry a pod 110 among the load port 114, the rotary pod shelf 105, and pod openers (substrate container cover opening/closing mechanism) 121 through successive operations of the pod elevator 118a and the pod carrying mechanism 118b.

Near the lower center part of the inside of the housing 111 in the front-to-back direction, a sub housing 119 is installed from the front-to-back center part of the housing 111 to the rear end of the housing 111. At a front wall 119a of the sub housing 119, a pair of wafer carrying entrances (substrate carrier entrances) 120 are installed in a manner such that the wafer carrying entrances 120 are vertically arranged at upper and lower positions, so as to carry wafers 200 into and out of the sub housing 119. At the upper and lower wafer carrying entrances 120, the pod openers 121 are respectively installed. Each of the pod openers 121 includes a stage 122 on which a pod 110 is placed, and a cap attach/detach mechanism (cover attach/detach mechanism) 123 configured to attach and detach a cap (cover) of a pod 110. The pod opener 121 is configured to open and close a wafer entrance of a pod 110 placed on the stage 122 by detaching or attaching a cap of the pod 110 using the cap attach/detach mechanism 123.

The sub housing 119 includes a transfer chamber 124 that is fluidically isolated from a space where the pod carrying device 118 or the rotary pod shelf 105 are installed. At the front region of the transfer chamber 124, a wafer transfer mechanism (substrate transfer mechanism) 125 is installed such that the wafer transfer mechanism 125 includes a wafer transfer device (substrate transfer device) 125a capable of rotating or straightly moving wafers 200 on a horizontal plane, and a wafer transfer device elevator (substrate transfer device elevating mechanism) 125b capable of moving the wafer transfer device 125a upward and downward. As shown in FIG. 2, the wafer transfer device elevator 125b is installed between the front right-end part of the transfer chamber 124 of the sub housing 119 and the right-end part of the housing 111 that is resistant to pressure. By successive operations of the wafer transfer device 125a and the wafer transfer device elevator 125b, wafers 200 are charged into or discharged out of a boat (substrate holding parts) 217 while tweezers (substrate holding elements) 125c of the wafer transfer apparatus 125a function as stage parts for the wafers 200.

At the rear region of the transfer chamber 124, a standby section 126 is provided to accommodate the boat 217. Above the standby section 126, a process furnace 202 is installed. The lower end of the process furnace 202 is configured to be opened and closed by a furnace port shutter (furnace port opening/closing mechanism) 147.

As shown in FIG. 2, between the right-end part of the standby section 126 of the sub housing 119 and the right-end part of the pressure resistant housing 111, a boat elevator (substrate holder elevating mechanism) 115 is installed for moving the boat 217 upward and downward. At an arm 128 as a connector connected to an elevating stage of the boat elevator 115, a seal cap 219 is horizontally installed as a cover. The seal cap 219 is configured to vertically support the boat 217 and close the lower end of the process furnace 202. The boat 217 includes a plurality of holding members to horizontally and respectively hold a plurality of wafers (for example, 50 to 125 wafers) in a state where the wafers 200 are vertically arranged with their centers being aligned.

As shown in FIG. 2, at the left-end part of the transfer chamber 124 opposite to the wafer transfer device elevator 125b and the boat elevator 115, a cleaning unit 134 is installed, which includes a supply fan and a dust filter so as to supply clean air 133 such as cleaned gas or inert gas. Between the wafer transfer device 125a and the cleaning unit 134, a notch aligning device (not shown) is installed as a substrate adjustment device for adjusting circumferential positions of wafers.

After clean air 133 blown through the cleaning unit 134 flows around the notch aligning device (not shown), the wafer transfer device 125a, and the boat 217 placed at the standby section 126, the clean air 133 is sucked through a duct (not shown) and discharged to the outside of the housing 111, or the clean air 133 is circulated to a suction side of the cleaning unit 134, that is, to a primary side (supply side) of the cleaning unit 134, and then, is blown again to the inside of the transfer chamber 124 by the cleaning unit 134.

Next, an operation of the substrate processing apparatus 10 relevant to the current embodiment of the present invention will be described. As shown in FIG. 2 and FIG. 3, when a pod 110 is supplied to the load port 114, the pod carrying entrance 112 is opened by moving the front shutter 113. Then, the pod 110 placed on the load port 114 is carried into the housing 111 through the pod carrying entrance 112 by the pod carrying device 118.

The pod 110 carried into the housing 111 is automatically carried and delivered to a designated shelf stage 117 of the rotary pod shelf 105 by the pod carrying device 118 and temporarily stored on the shelf stage 117, and then, the pod 110 is carried and delivered from the shelf stage 117 to one of the pod openers 121 and temporarily stored on the pod opener 121, and then, the pod 110 is transferred to the stage 122, or the pod 110 carried into the housing 111 may be directly carried to the pod opener 121 and transferred to the stage 122 by the pod carrying device 118. At this time, since the wafer carrying entrance 120 corresponding to the pod opener 121 is closed by the cap attach/detach mechanism 123, the inside of the transfer chamber 124 is filled with clean air 133 blown into the transfer chamber 124. For example, according to settings, as the transfer chamber 124 is filled with nitrogen gas as clean air 133, the oxygen concentration of the inside of the transfer chamber 124 becomes equal to or lower than 20 ppm, which is much lower than the oxygen concentration of the inside of the housing 111 which is under ambient atmosphere.

When the pod 110 is placed on the stage 122, the opened side of the pod 110 is pushed against the periphery of an opening of the wafer carrying entrance 120 formed in the front wall 119a of the sub housing 119, and at the same time, the cap of the pod 110 is detached by the cap attach/detach mechanism 123, so that the wafer entrance of the pod 110 is opened.

When the pod 110 is opened by the pod opener 121, a wafer 200 is picked up from the pod 110 through the wafer entrance of the pod 110 by the tweezers 125c of the wafer transfer device 125a and is adjusted in orientation at the notch aligning device (not shown), and then the wafer 200 is carried to the standby section 126 located at the rear side of the transfer chamber 124 and charged into the boat 217. After the wafer transfer device 125a charges the wafer 200 into the boat 217, the wafer transfer device 125a returns to the pod 110 to charge the next wafer 200 into the boat 217.

While wafers 200 are charged from one of the pod openers 121 (the upper or lower pod opener 121) into the boat 217 by the wafer transfer mechanism 125, another pod 110 is carried and transferred to the other of the pod openers 121 (the lower or upper pod opener 121) from the rotary pod shelf 105 by the pod carrying device 118, so as to perform an opening operation simultaneously on the pod 110 by using the other pod opener 121.

If a predetermined number of wafers 200 are charged into the boat 217, the lower end of the process furnace 202 closed by the furnace port shutter 147 is opened by moving the furnace port shutter 147. Subsequently, as the seal cap 219 is moved upward by the boat elevator 115, the boat 217 in which a group of wafers 200 is held is loaded into the process furnace 202.

After the boat 217 is loaded, a predetermined process is performed on the wafers 200 in the process furnace 202. After the predetermined process is performed, in the approximate reverse order of the loading order except for the wafer aligning process using the notch aligning device (not shown), the wafers 200 and the pods 110 are unloaded out of the housing 111.

Next, a main controller 14 disposed in the substrate processing apparatus 10 to control each device in the substrate processing apparatus 10 will now be described.

Figure 4:
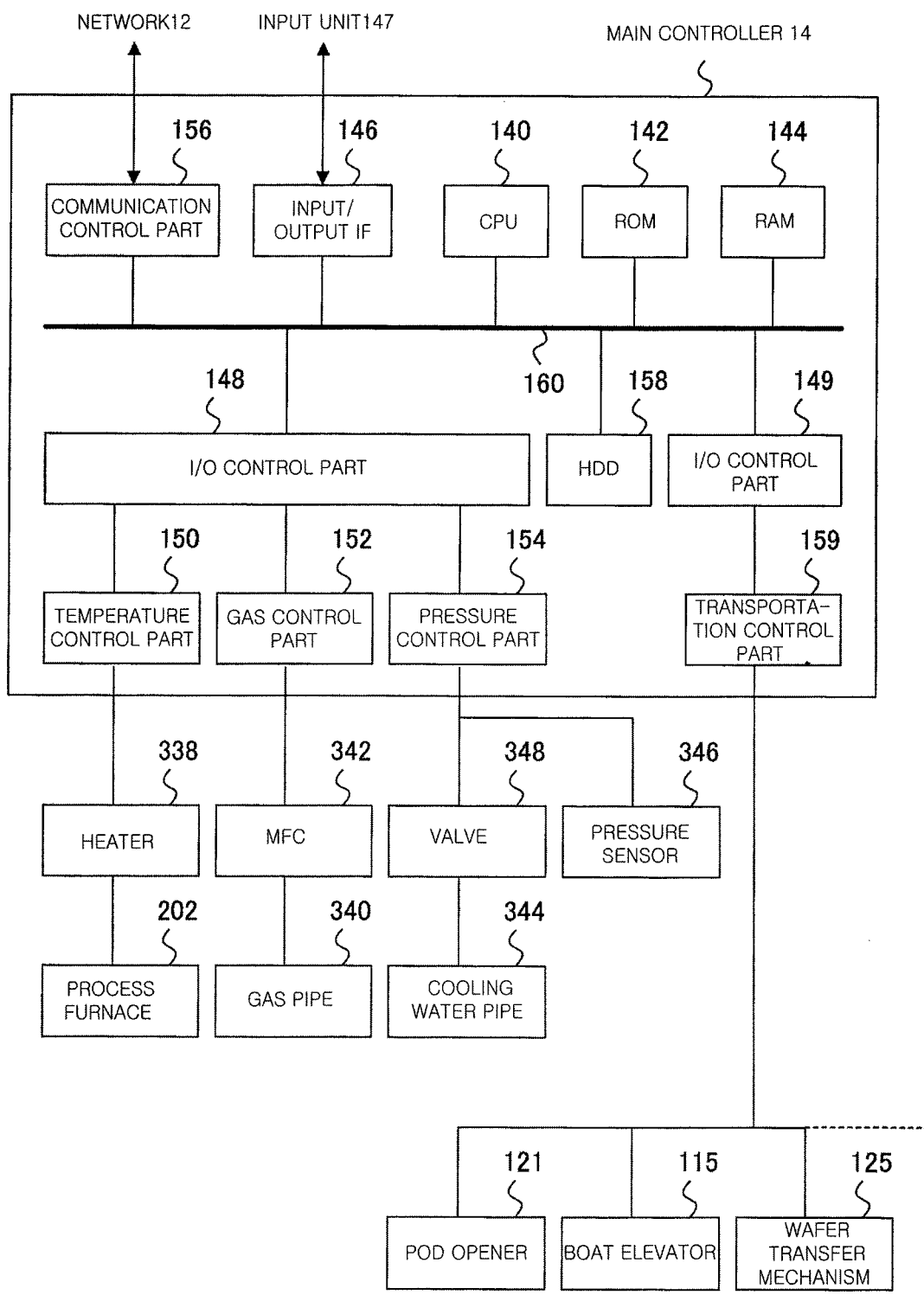
FIG. 4 is a block diagram illustrating a hardware configuration of the substrate processing apparatus according to the embodiment of the present invention.

FIG. 4 is a block diagram illustrating functions and a configuration of the substrate processing apparatus 10 with respect to the main controller 14.

As shown in FIG. 4, the main controller 14 includes: a central processing unit (CPU) 140; a read-only memory (ROM) 142; a random access memory (RAM) 144; a hard disk drive (HDD) 158 configured to store data; an input/output interface (IF) 146 configured to transmit and receive data between a display device and an input unit 147 including an input device such as a keyboard; a communication control part 156 configured to control data communications through the network 12 with the other hardware (such as a connection management device 4); a temperature control part 150; a gas control part 152; a pressure control part 154; and an I/O control part 148 configured to perform an I/O control operation for parts such as the temperature control part 150. These constitutional elements of the main controller 14 are connected to one another through a bus 160, so that data is input and output between the constitutional elements through the bus 160.

In the main controller 14, the CPU 140 processes a substrate based on a predetermined recipe. In detail, the CPU 140 outputs control data (control instruction) to parts such as the temperature control part 150, the gas control part 152, and the pressure control part 154. The ROM 142, the RAM 144, and the HDD 158 store programs or data such as a sequence program, data input from the input/output IF 146, and data input through the communication control part 156.

The temperature control part 150 adjusts the inside temperature of the process furnace 202 by controlling a heater 338 installed at the outer circumference of the above-described process furnace 202. The gas control part 152 controls the amount of reaction gas supply to the inside of the process furnace 202 based on values output from an MFC (mass flow controller) 342 installed at a gas pipe 340 of the process furnace 202. The pressure control part 154 controls the pressure of cooling water supplied to the inside of the process furnace 202 by adjusting a valve 348 based on values output from a pressure sensor 346 installed at a cooling water pipe 344 of the process furnace 202. A transportation control part 159 controls transportation systems such as the pod opener 121, the boat elevator 115, and the wafer transfer mechanism 125. In this way, the control parts such as the temperature control part 150 are operated to control the components (such as the heater 338, the MFC 342, and the valve 348) of the substrate processing apparatus 10 based on control instructions output from the CPU 140.

Thus, the CPU 140 executes a sequence program to read a command from a transmitted recipe and carry out the command. These steps in which target values of control parameters are set are sequentially performed, and the control instruction can be transmitted to the temperature control part 150, the gas control part 152, the pressure control part 154, and the transportation control part 159 through the I/O control part 148 and an I/O control part 149 so as to process substrates. According to the control instruction, the control parts such as the temperature control part 150 are operated to control components (such as the heater 338, the MFC 342, and the valve 348,) of the substrate processing apparatus 10. In this way, a processing process is performed on wafers 200.

The CPU 140 transmits monitor data about states of the substrate processing apparatus 10, such as temperature information and pressure information, to the server 4 of the group management apparatus 100 through the communication control part 156. In addition, the CPU 140 transmits process information and information about an event and an error occurring from the substrate processing apparatus 10, to the server 4 in the same manner.

Figure 5:
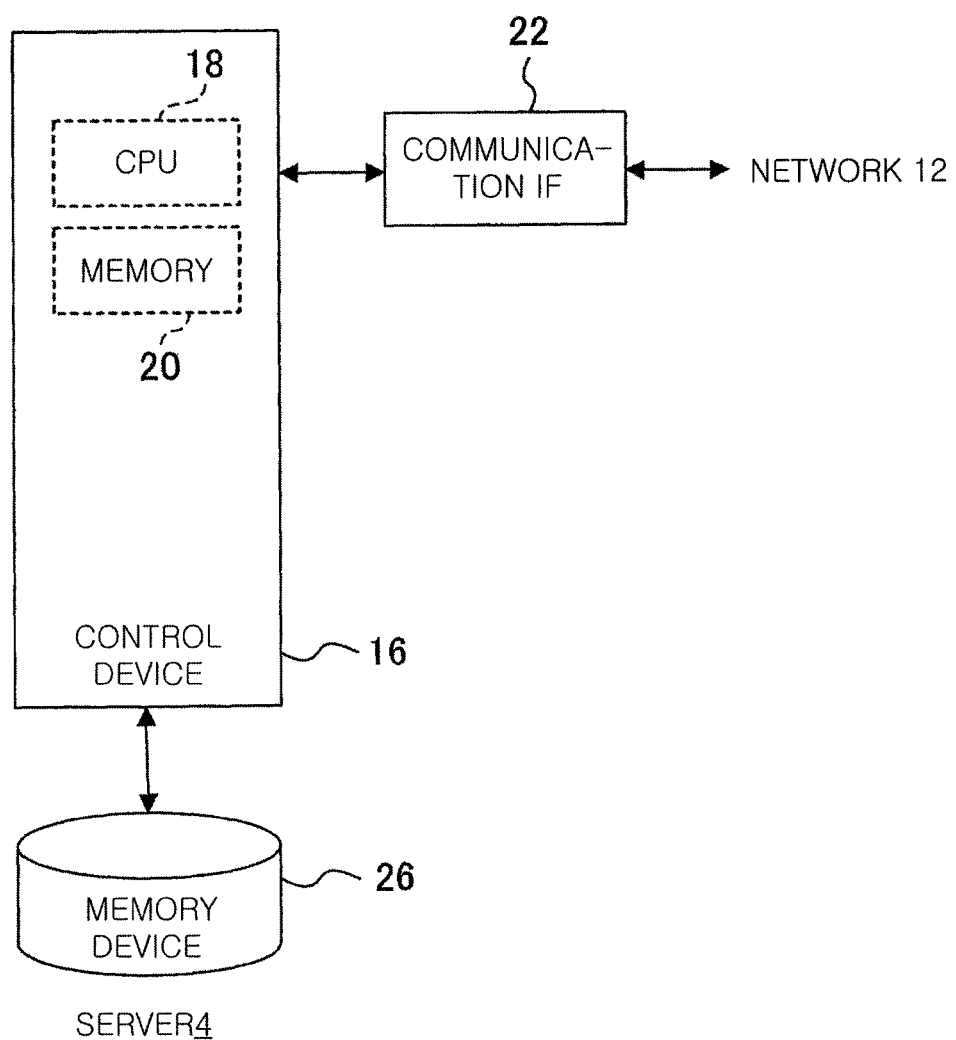
FIG. 5 is a schematic illustrating a hardware configuration of a server of a group management apparatus according to the embodiment of the present invention.

As shown in FIG. 5, the server 4 includes a control device 16 including a CPU 18 and a memory 20, a communication interface (IF) 22 used as a data acquisition unit configured to transmit and receive data to and from external hardware through the network 12, and a memory device 26 including a hard disk drive used as a storage unit configured to store all information that is transmitted from the above-described substrate processing apparatus 10. Although the single memory device 26 is shown in FIG. 5, the memory device 26 may be provided in plurality. For example, the memory device 26 may be used as a first storage part to accumulate monitor data, transmitted from the substrate processing apparatus 10, as a database, and be used as a second storage part to store EE (equipment engineering) contents as a file. The CPU 18 reads contents of the EE contents stored in the memory device 26, develops the contents in the memory 20, and statistically processes and analyzes data accumulated in the memory device 26 according to the contents of the EE contents so as to determine whether the substrate processing apparatus 10 that is a data transmitting source is abnormal. The display terminal 6 including a monitor (display unit) configured to display various screens has the same configuration as that of the server 4, and includes a display control unit (CPU) configured to change screens according to an instruction from an input unit (not shown).

Next, a process of detecting an abnormality of the substrate processing apparatus 10 will be described.

Figure 6:
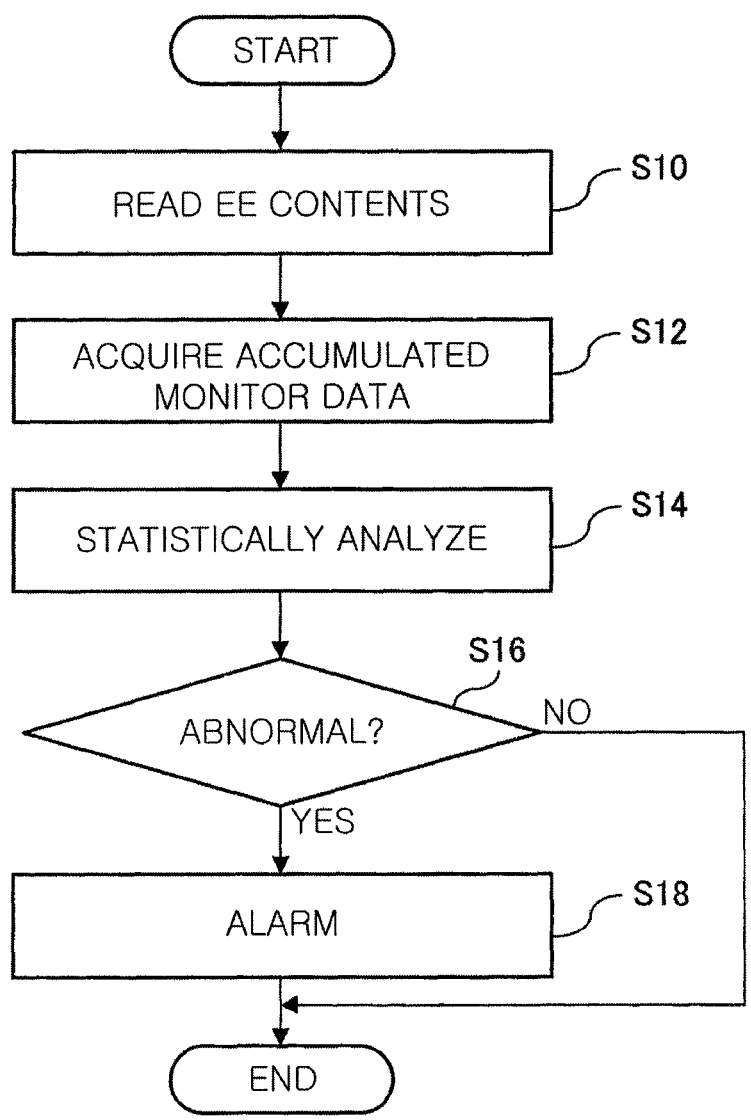
FIG. 6 is a flowchart illustrating an abnormality detection control flow in the substrate processing system according to the embodiment of the present invention.

FIG. 6 is a flowchart illustrating an abnormality detection process performed by the CPU 18 of the server 4. First, in step S10, the CPU 18 reads EE contents stored as a file in the memory device 26. Here, the term EE is an abbreviation for equipment engineering, which is an inventive approach for improving productivity of substrate processing apparatuses. In addition, a content is a definition of how to see monitor data of a substrate processing apparatus and how to determine whether a substrate processing apparatus is abnormal. In the current embodiment, EE contents denote abnormality detection conditions such as a target apparatus, a target recipe, steps of the target recipe, a target period, a representative value (maximum value/minimum value/mean value), and an analytical method.

Next, in step S12, among the monitor data accumulated as a database in the memory device 26, monitor data corresponding to the EE contents, and monitor data sequentially transmitted from the substrate processing apparatus 10 are acquired. The monitor data transmitted from the substrate processing apparatus 10 is also accumulated in the database.

Next, in step S14, based on an analytical method of the EE contents defined in step S10, the monitor data acquired in S12 is statistically processed. In a statistical operation where the monitor data acquired in S12 is statistically processed, for example, a standard deviation is calculated from the monitor data accumulated in the database, and a predetermined upper limit and a predetermined lower limit are set from the calculated standard deviation, and the set upper and lower limits are compared with monitor data that undergoes a detection operation.

Next, in step S16, it is determined whether the substrate processing apparatus 10 is normal or abnormal. For example, it is determined that the substrate processing apparatus 10 is normal if the monitor data undergoing the detection operation is disposed within a range from the lower limit to the upper limit, and it is determined that the substrate processing apparatus 10 is abnormal if the monitor data undergoing the detection operation is disposed out of the range from the lower limit to the upper limit.

When it is determined that the substrate processing apparatus 10 is abnormal in step S16, an abnormality signal is output to the display terminal 6 in step S18 to display the abnormal state of the substrate processing apparatus 10. When it is determined that the substrate processing apparatus 10 is normal in step S16, the abnormality detection process is ended.

Next, a registration of EE contents will be described.

Figure 7:
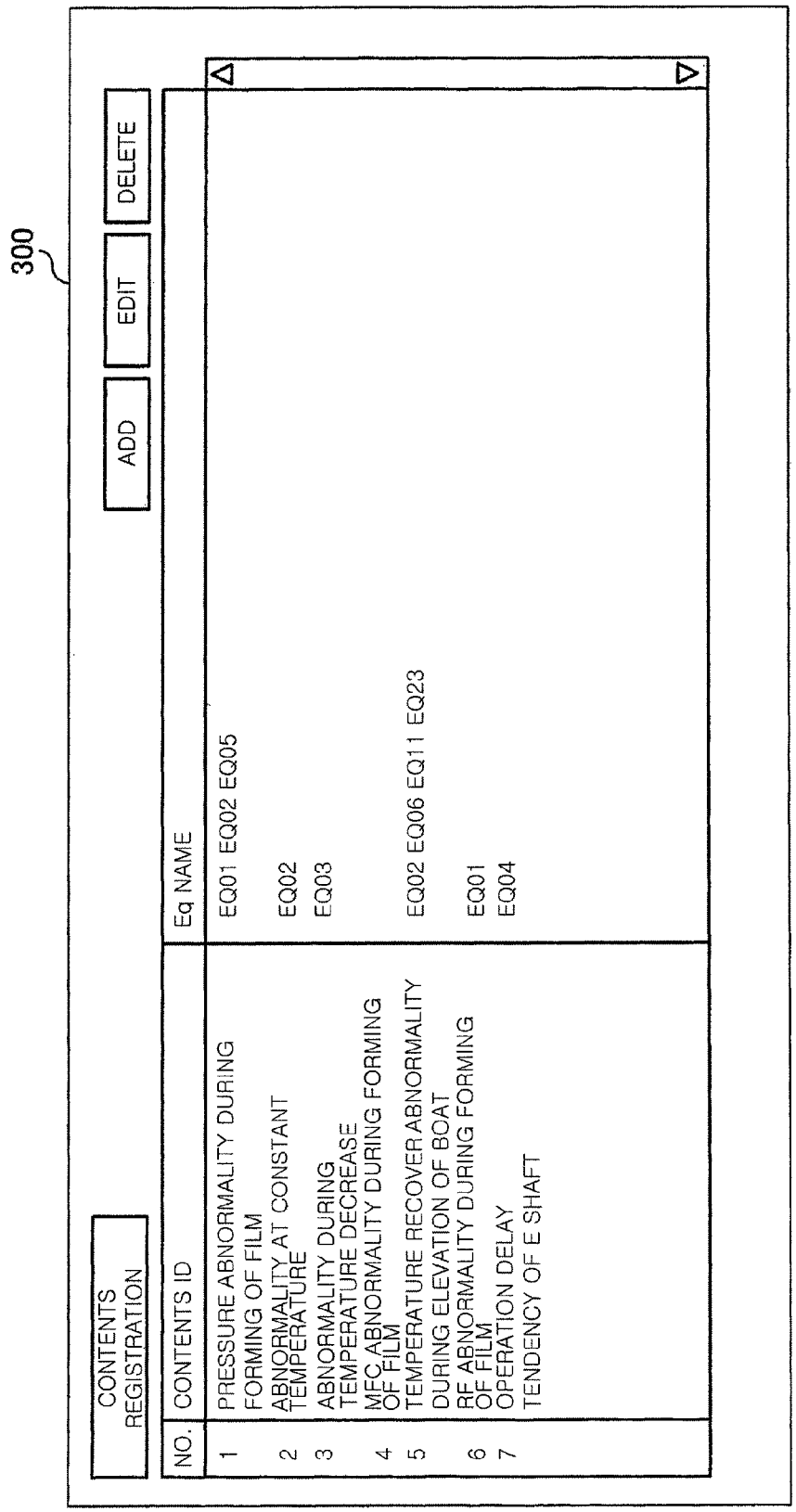
FIG. 7 illustrates an abnormality detection condition selection screen in which an abnormality detection condition is selected, in the substrate processing system according to the embodiment of the present invention.

FIG. 7 illustrates an abnormality item selection screen 300 displayed on the display terminal 6. Registered EE contents are displayed on the abnormality item selection screen 300. IDs (identifications) are assigned to the EE contents, respectively. The EE contents are set at substrate processing apparatuses 10, respectively. For example, 'PRESSURE ABNORMALITY DURING FORMING FILM' assigned to ID 1 is set at each of substrate processing apparatuses 10-1 (EQ01), 10-2 (EQ02), and 10-3 (EQ05). Further, the EE contents includes 'ABNORMALITY AT CONSTANT TEMPERATURE', 'ABNORMALITY DURING TEMPERATURE DECREASE', 'MFC ABNORMALITY DURING FORMING OF FILM', 'TEMPERATURE RECOVER ABNORMALITY DURING ELEVATION OF BOAT', 'RF ABNORMALITY DURING FORMING OF FILM', and 'OPERATION DELAY TENDENCY OF E SHAFT' (delay abnormality of an E shaft configured to move an elevator upward). The abnormality item selection screen 300 also function as a manipulation screen that may be used to add, edit, and delete abnormality items.

Figure 8:
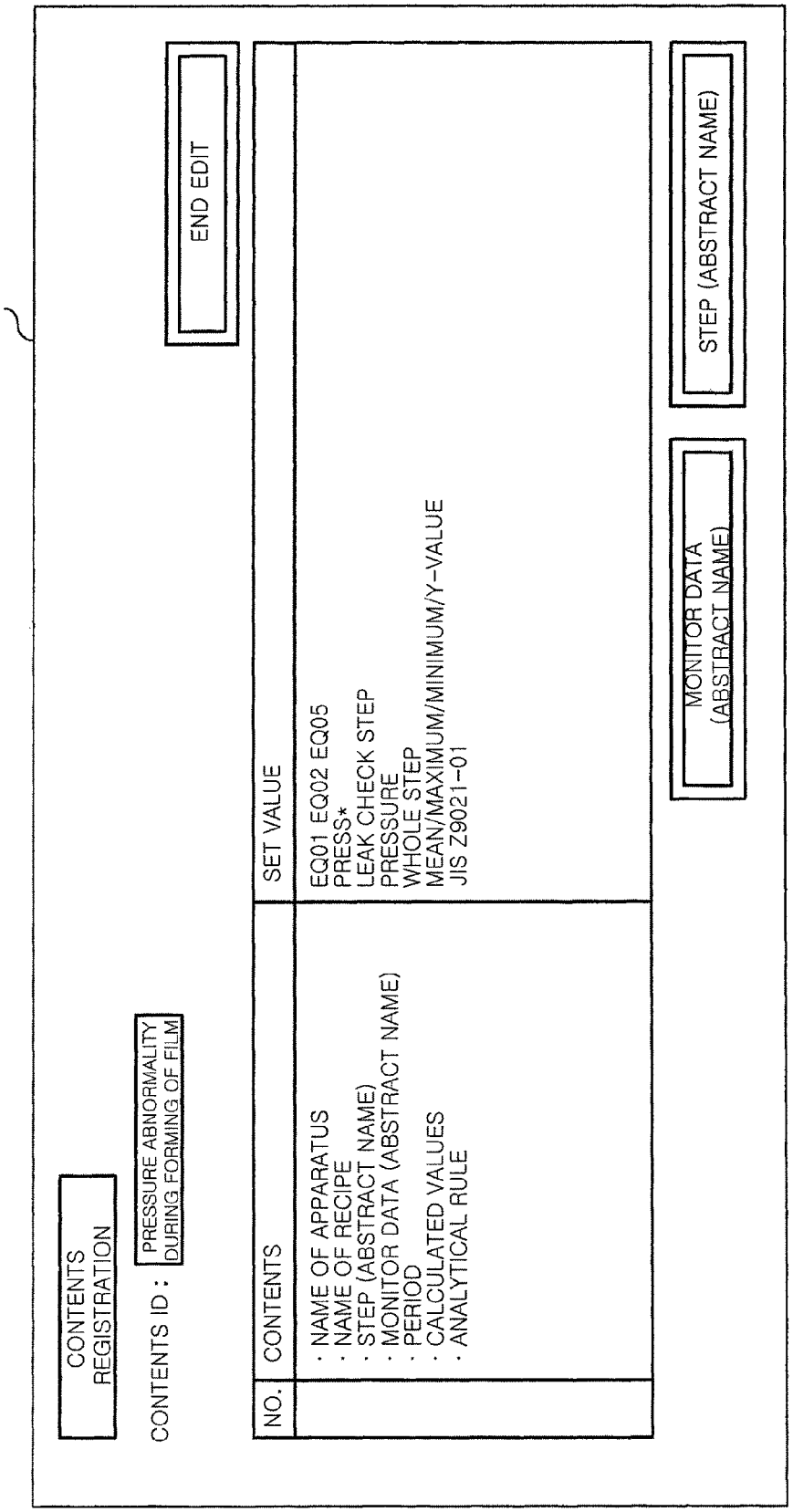
FIG. 8 illustrates a registration screen in which a set item for an abnormality item is registered, in the substrate processing system according to the embodiment of the present invention.

FIG. 8 illustrates a registration screen 400 that is used to register abnormality detection conditions with respect to 'PRESSURE ABNORMALITY DURING FORMING OF FILM' assigned to ID 1 of the EE contents. For abnormality detection, set values (denoted by 'SET VALUE' in FIG. 8 and may be contents) versus set items (denoted by 'CONTENTS' in FIG. 8) are registered. In this case, target apparatuses are the substrate processing apparatuses 10-1 (EQ01), 10-2 (EQ02), and 10-5 (EQ05), a target recipe is 'PRESS*', a target step is a leak check step, intended monitor data is pressure, a target period is the whole step, intended calculation values are a mean value, a maximum value, a minimum value, and a Y value, and an analytical rule is a method prescribed in JIS (Japanese Industrial Standards) Z9021-01.

In addition, the set items are set corresponding to each of the EE contents, and it may be unnecessary to set values for all items.

The set items with respect to each ID of the EE contents are set by a technician of an apparatus maker of a function supply source. For these set conditions, a device technician (process engineer) of a function supply destination just registers set values. In addition, monitor data and recipes are expressed by abstract names that can be appreciated by the process engineer.

This regard will be described in more detail.

Figure 9:
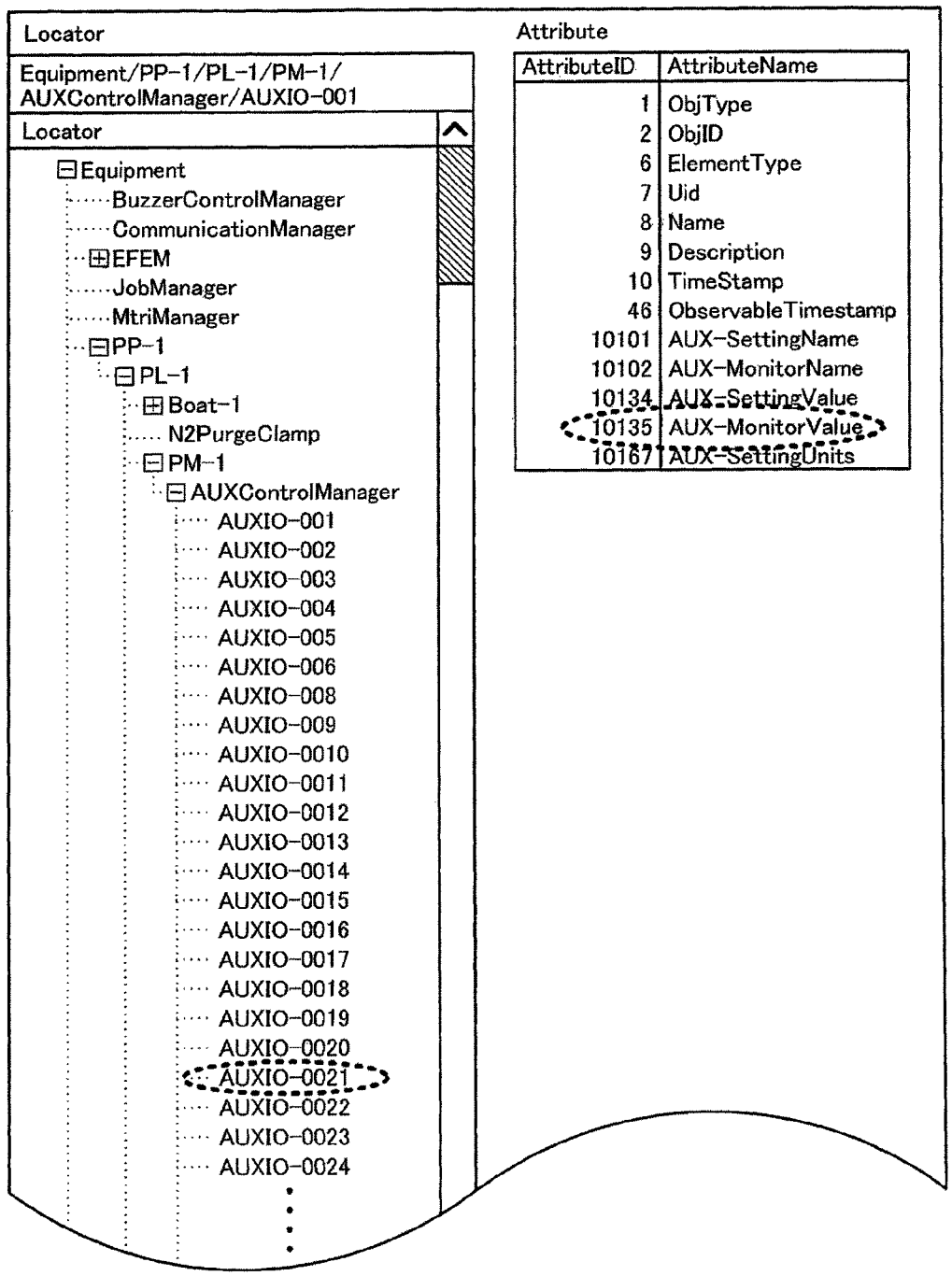
FIG. 9 is a screen illustrating objects of a substrate processing apparatus and set values of the objects, in the substrate processing system according to the embodiment of the present invention.

FIG. 9 is a tree illustrating objects of a substrate processing apparatus, which are written in CEM (Common Equipment Model) of SEMI (Semiconductor Equipment and Materials International) standards, and values of the objects. Here, a part written in the same manner as 'AUX10=001' is an AUX channel. The AUX channel is a physical order assigned to an AUX port that is a complementary port, and can be set to freely input an output from a sensor.

In this way, a CEM notation describes various types of monitor data, and uses difficult monitor data names classified by an English notation, which is unfamiliar to a process engineer, and thus, a designation operation is difficult. In addition, when a registration operation is performed just according to the CEM notation, the registration operation may be undesirably performed. Furthermore, since six types of monitor data including AUX-SettingName, AUX-MonitorName, AUX-SettingValue, AUX-MonitorValue, AUX-SettingUnits, and AUX-MonitorUnits are provided, it is difficult to select an intended one from the names of the six types of the monitor data.

Figure 10:
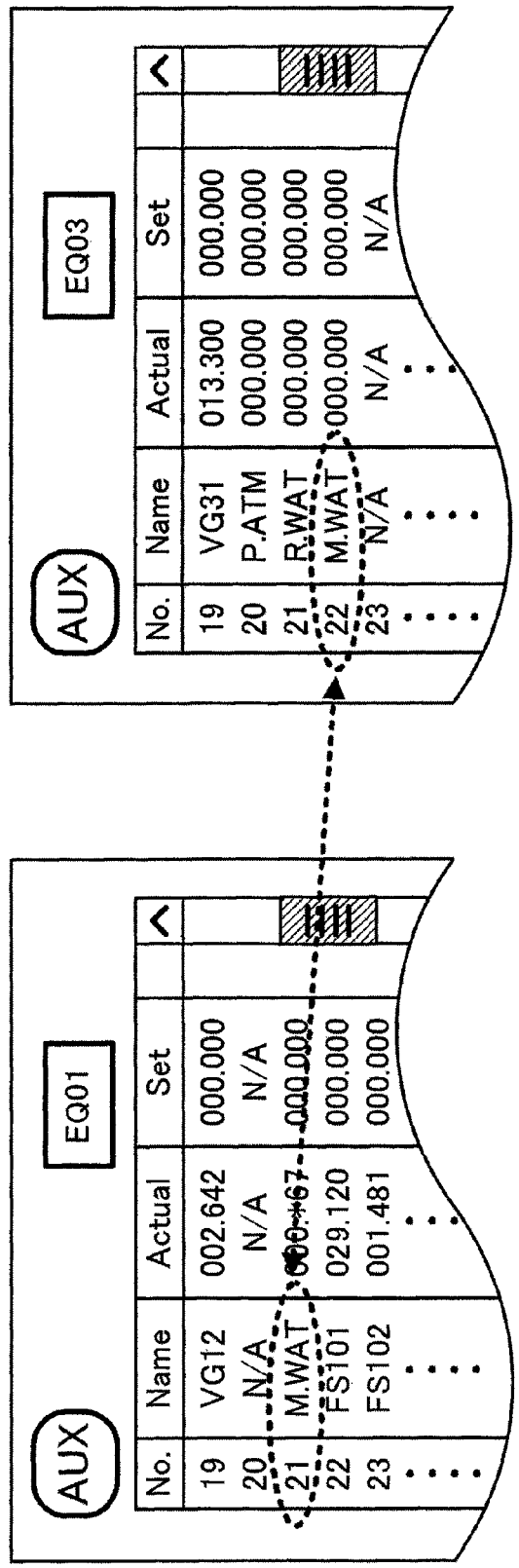
FIG. 10 is a screen illustrating specifications of substrate processing apparatuses in the substrate processing system according to the embodiment of the present invention.

In addition, when the configurations of substrate processing apparatuses are different, channels (sensor positions) assigned to the same monitor data may be different. For example, as shown in FIG. 10, while AUX 10-021 is assigned to a cooling water pressure M.WAT of the substrate processing apparatus 10-1 (EQ01), AUX 10-022 is assigned to a cooling water pressure M.WAT of the substrate processing apparatus 10-3 (EQ03). In this way, since the same monitor data has different channels, if a channel number is just designated to designate monitor data based on the channel number, unexpected data may be assumed as an abnormality detection target.

Consequently, in the current embodiment, each of substrate processing apparatuses is provided with a table that links abstract names of monitor data with channel numbers.

FIG. 11 illustrates a link table 500 as described above. For example, with respect to a monitor data abstract name 'COOLING WATER PRESSURE', M.WAT (CH21) is assigned to the substrate processing apparatus 10-1 (EQ01), and M.WAT (CH22) is assigned to the substrate processing apparatus 10-1 (EQ03). In addition, as indicated with dotted line of FIG. 9, from M.WAT (CH21), an automatic rewriting operation is performed at 'AUX10-021' of CEM, and '10135 AUX-MonitorValue'. Thus, just by inputting monitor data expressed by an abstract name, a channel and a set value adapted for each substrate processing apparatus can be set with reference to the link table 500 of FIG. 11.

Figure 12:
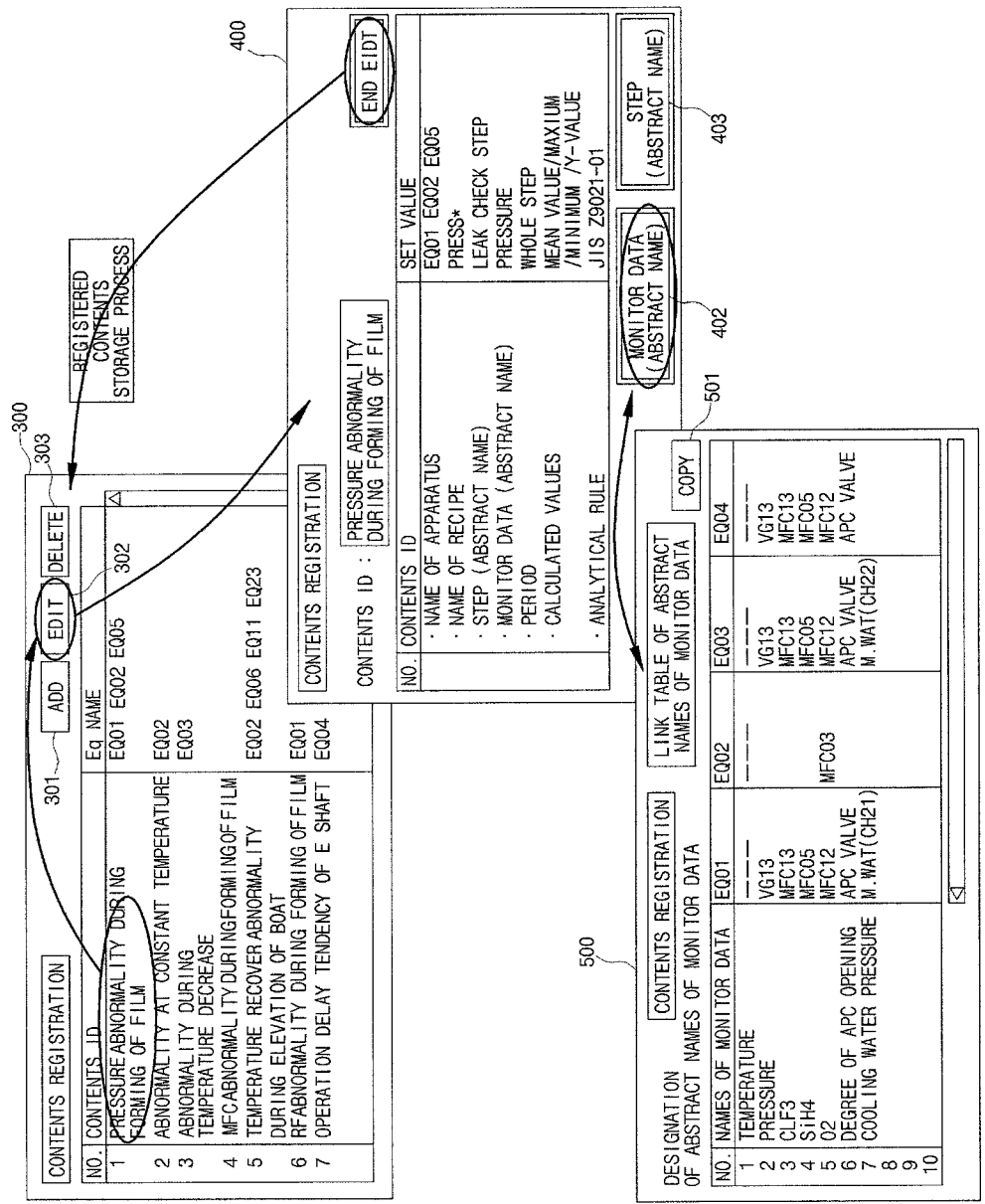
FIG. 12 illustrates transition of a screen when an abnormality detection condition is registered, in the substrate processing system according to the embodiment of the present invention.

FIG. 12 illustrates transition of a screen displayed on the display terminal 6 when EE contents are registered. The transition of the screen is performed by the CPU of the display terminal 6, but may be controlled at the server 4. First, the display terminal 6 displays the abnormality item selection screen 300 shown in FIG. 7. On the abnormality item selection screen 300, an 'ADD' button 301, an 'EDIT' button 302, and a 'DELETE' button 303 are displayed. When the 'ADD' button 301 is pressed, new EE contents are allowed to be registered. When EE contents to be deleted are selected, and the 'DELETE' button 303 is pressed, the selected EE contents are deleted. To edit EE contents, the 'EDIT' button 302 is pressed.

When the 'EDIT' button 302 is pressed, the registration screen 400 shown in FIG. 8 is displayed. In the registration screen 400, an 'END EDIT' button 401, a 'MONITOR DATA (ABSTRACT NAME)' button 402, and a 'STEP (ABSTRACT NAME)' button 403 are displayed. When a set value is edited in the registration screen 400, and the 'END EDIT' button 401 is pressed, an edit operation is ended, and the abnormality item selection screen 300 is displayed again. When the 'MONITOR DATA (ABSTRACT NAME)' button 402 is pressed, the link table 500 shown in FIG. 11 is displayed. In the state where the link table 500 is displayed, a link of a channel with the abstract name of monitor data at each substrate processing apparatus can be edited.

In addition, the link table 500 is created by a technician of an apparatus maker of a function supply source. For example, since a technician of an apparatus maker of a function supply source can know what number AUX channel is connected with a cooling water pressure by seeing an electrical schematic diagram of a substrate processing apparatus, the technician can easily register the AUX channel, connected with the cooling water pressure, in the link table 500.

When the 'STEP (ABSTRACT NAME)' button 403 is pressed, as in the case where the 'MONITOR DATA (ABSTRACT NAME)' button 402 is pressed, a step name list for connecting a step denoted by an abstract name (for example, for connecting a leak check step) is displayed, so that a step number of a step denoted by an abstract name can be registered at each substrate processing apparatus.

Next, a case where a new substrate processing apparatus 10 is added to the substrate processing system 2 will be described.

When the substrate processing apparatus 10 is additionally connected to the group management apparatus 100, it is necessary to add link tables for the added substrate processing apparatus 10, as shown in FIG. 11. However, since it takes a long time to create the link tables one by one, registered contents of a registered substrate processing apparatus 10 may be used if possible. However, as shown in FIG. 10, similar apparatuses may have different channels of monitor data, and copying of different channels may cause a detection error.

Consequently, in the current embodiment, a mechanism used to safely perform an adding process is provided.

Figure 13:
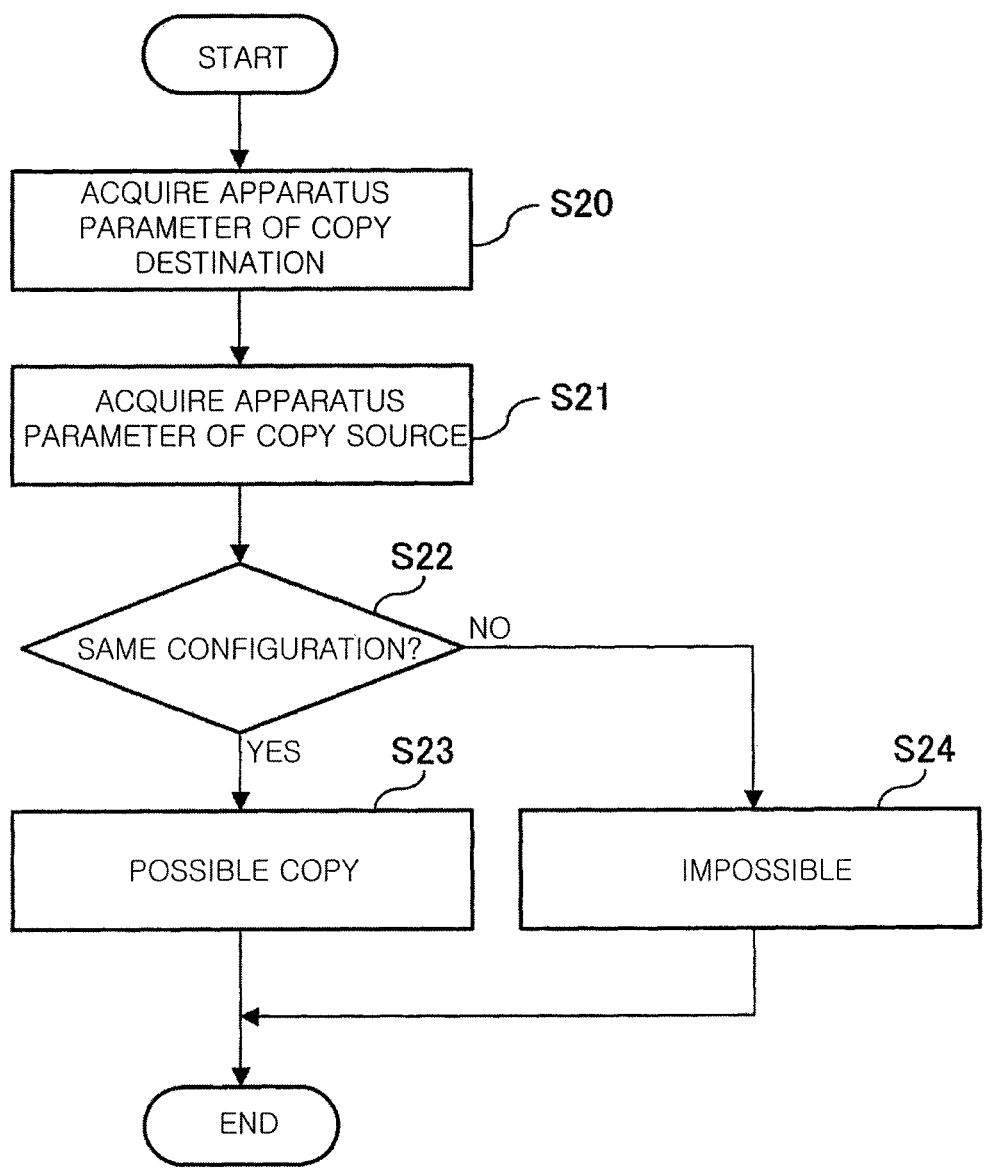
FIG. 13 is a flowchart illustrating a control flow when registered contents of a registered substrate processing apparatus are copied, in the substrate processing system according to the embodiment of the present invention.

FIG. 13 illustrates a control flow performed by the CPU 18 of the server 4 when registered contents of a registered substrate processing apparatus are copied.

First, in step S20, the CPU 18 acquires an apparatus parameter of a copy destination.

Next, in step S21, an apparatus parameter of a copy source is acquired. The apparatus parameter of the copy source is acquired by selecting a substrate processing apparatus to be copied from the link table 500, and by clicking a copy button 501 provided to the screen displayed with the link table 500. Next, in step S22, the apparatus parameter of the copy destination acquired in step S20 is compared with the apparatus parameter of the copy source acquired in step S21. In step S22, if it is determined that the apparatus parameter of the copy destination is the same as the apparatus parameter of the copy source, the copying is allowed in step 23, and the control flow is ended. Meanwhile, in step S22, if it is determined that the apparatus parameter of the copy destination is different from the apparatus parameter of the copy source, the copying is disallowed in step 24, and the control flow is ended.

In this way, when a copy operation is performed, parameters of apparatuses are compared to allow only validated registered contents to be copied, thereby safely performing the apparatus adding process.

Figure 14:
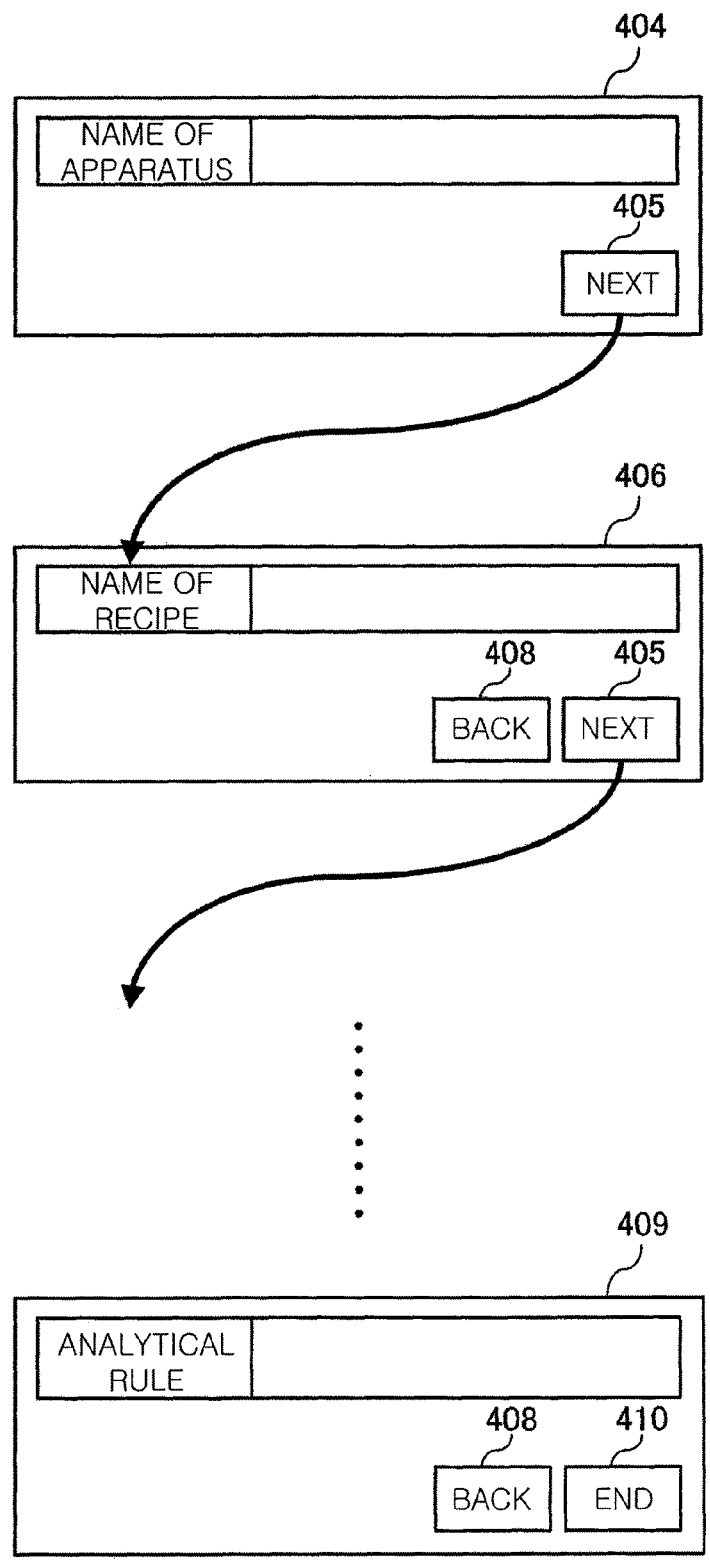
FIG. 14 illustrates transition of a screen when an abnormality detection condition is registered, in a substrate processing system according to another embodiment of the present invention.

FIG. 14 illustrates transition of a screen when EE contents are registered according to another embodiment of the present invention. In the above-described embodiment, conditions of EE contents are collectively displayed and collectively registered as shown in FIG. 8. However, in the current embodiment, conditions of EE contents are sequentially registered.

That is, for example, when an abnormality detection condition with respect to 'PRESSURE ABNORMALITY DURING FORMING OF FILM' is registered, a first screen 404 is displayed first. In the first screen 404, 'NAME OF APPARATUS' is displayed, and the name of an intended substrate processing apparatus is input. In the first screen 404, when the inputting of the name of the substrate processing apparatus is completed, a 'NEXT' button 405 is pressed. When the 'NEXT' button 405 is pressed, a second screen 406 is displayed. 'NAME OF RECIPE' is displayed in the second screen 406, the name of a target recipe is input. In the second screen 406, when the inputting of the name of the recipe is completed, a 'NEXT' button 405 is pressed. When a 'BACK' button 408 is pressed, the first screen 404 is displayed again. In this way, the name of an apparatus→the name of a recipe→a step (abstract name)→ . . . an analytical rule, and set values respectively for set items are input. Finally, when an 'END' button 410 provided to a seventh screen 409 that displays 'ANALYTICAL RULE' is pressed, the registration is completed. When registration of one contents ID is completed, set items of the next contents ID are sequentially displayed in the same manner as the previous one, the next contents ID can be registered by sequentially inputting set values.

As described above, since contents of a set item can be modified at each abnormality item according to the above-described embodiment, the abnormality item can be further optimally set. In addition, even when a process condition (or the type of a film) is changed, a registration operation can be performed on a registration screen just by changing a set item. In addition, even when process conditions of substrate processing apparatuses are different with respect to the same abnormality item, a registration operation can be performed just by changing contents of a set item.

In addition, according to the above-described embodiment, a substrate processing apparatus is connected to a group management apparatus through a network, but it may be unnecessary to dispose a group management apparatus on a floor (clean room) that accommodates, for example, a substrate processing apparatus. For example, a LAN connection can be used to dispose a group management apparatus at an office, and furthermore, the Internet can be interposed to dispose a group management apparatus at the outside of a factory.

In addition, EE contents are stored in the memory device 26 of the server 4, but the EE contents may be stored in a memory device of the display terminal 6. Moreover, the abnormality detection function of the present invention may be provided to the main controller 14.

In addition, instead of integrating a memory device configured to store a database, a control part, a manipulation part, and a display part, they may be discretely formed, so that data in the database may be remotely searched by using the manipulation part.

In addition, the substrate processing apparatus 10 according to the present invention is not limited to a semiconductor manufacturing apparatus, and thus, can be easily applied to an apparatus configured to process a glass substrate that is used, for example, in a liquid crystal display (LCD) apparatus. In addition, the substrate processing apparatus 10 according to the present invention is not limited to a process performed in a furnace, and thus, can perform film forming processes including a CVD process, a PVD (physical vapor deposition) process, a process of forming an oxide film, and a process of forming a nitride film, and a process of forming a film including a metal. In addition, the substrate processing apparatus 10 according to the present invention is not limited to a vertical type apparatus, and thus, can be easily applied to a single wafer type apparatus.

According to the present invention, an abnormality detection condition can be easily and accurately registered.

Although the present invention is characterized by the appended claims, the present invention also includes the following embodiments.

Supplementary Note 1

According to a preferred embodiment of the present invention, there is provided a substrate processing system comprising: a substrate processing apparatus configured to process a substrate, and a group management apparatus configured to connect and manage a plurality of substrate processing apparatuses, wherein the group management apparatus includes: a communication part configured to transmit and receive data to and from the substrate processing apparatus; a first storage part configured to store the data transmitted through the communication part from the substrate processing apparatus; a second storage part configured to store, when a predetermined abnormality is detected from at least the data, a file that prescribes a condition for detecting the abnormality (abnormality detection condition); a display part including a manipulation screen configured to input a condition for detecting an abnormality by using the file or the data stored in the first storage part and/or the second storage part; and a screen control part configured to change, when an abnormality item for detecting an abnormality is selected from a plurality of abnormality items (abnormality phenomena/abnormality targets) in the manipulation screen, the manipulation screen to a registration screen configured to register the abnormality detection condition corresponding to the selected abnormality item.

Supplementary Note 2

In the substrate processing system of Supplementary Note 1, the abnormality detection condition may comprise set items such as a target apparatus, a target recipe, a target step, a target period, a representative value (such as maximum value/minimum value/mean value), and an analytical method.

Supplementary Note 3

The substrate processing system of Supplementary Note 2 comprises a link table created for the predetermined set item.

Supplementary Note 4

According to another preferred embodiment of the present invention, there is provided an abnormality detecting method based on an abnormality detection condition set in advance by a predetermined manipulation on a manipulation screen and including searching and analyzing data accumulated in a database (a first storage unit), the method comprising: selecting an abnormality item for detecting an abnormality from a plurality of abnormality items on the manipulation screen; changing the manipulation screen to a registration screen configured to register a condition used for detecting an abnormality corresponding to the selected abnormality item; and reading and analyzing the data, accumulated in the database, based on the condition registered in the registration screen so as to determine the abnormality.

Supplementary Note 5

According to another preferred embodiment of the present invention, there is provided a group management apparatus comprising: a communication part configured to transmit and receive data to and from a substrate processing apparatus configured to process a substrate; a first storage part configured to store the data transmitted through the communication part from the substrate processing apparatus; a second storage part configured to store, when a predetermined abnormality is detected from at least the data, a file that prescribes a condition for detecting the abnormality (abnormality detection condition); a display part including a Manipulation screen configured to input a condition for detecting an abnormality by using the file or the data stored in the first storage part and/or the second storage part; and a screen control part configured to change, when an abnormality item for detecting an abnormality is selected from a plurality of abnormality items (abnormality phenomena/abnormality targets) in the manipulation screen, the manipulation screen to a screen configured to register the abnormality detection condition corresponding to the selected abnormality item.

What is claimed is:

1. A substrate processing system comprising:
a plurality of substrate processing apparatuses configured to process a substrate; and
a group management apparatus configured to connect and manage the plurality of substrate processing apparatuses,
wherein the group management apparatus includes:
a communication part configured to transmit and receive a monitor data to and from the plurality of substrate processing apparatuses;
a first storage part configured to store the monitor data transmitted through the communication part from the plurality of substrate processing apparatuses;
a second storage part configured to store a file prescribing a condition for determining an abnormality of the plurality of substrate processing apparatuses from the monitor data;
a display part including a manipulation screen for inputting the condition for determining the abnormality using the monitor data stored in the first storage part or the file stored in the second storage part;
a screen control part configured to control the display part to change an abnormality item selection screen displaying a plurality of abnormality items, one of which is to be selected into a registration screen for registering the one of the plurality of abnormality items condition corresponding to at least one of the plurality of abnormality selection screen; and
a control part configured to determine the abnormality of the plurality of substrate processing apparatuses by reading from the second storage part and ana-
lyzing the monitor data stored in the first storage part based on the condition for determining the abnormality,
wherein the control part is configured to display: an ID of the condition for determining the abnormality, one of the plurality of substrate processing apparatuses having the condition for determining the abnormality and an EDIT button for editing the condition for determining the abnormality at least on the abnormality item selection screen; and is configured to perform an editing of the condition for determining the abnormality on the manipulation screen when the EDIT button is pressed with the condition for determining the abnormality selected,
wherein the screen control part is configured to control the display part to change the abnormality item selection screen to the registration screen displaying and END EDIT button, a MONITOR DATA button and a STEP button when the EDIT button displayed on the abnormality item selection screen is pressed,
wherein the control part is configured to allow an editing of the monitor data referred to on the registration screen in case of the abnormality by displaying a link table linking an abstract name and a channel number of the monitor data for each of the plurality of substrate processing apparatuses when the MONITOR DATA button displayed on the registration screen is pressed, and is configured to allow a registration of a step indicated as the abstract name for each of the plurality of substrate processing apparatuses and a step number for a step name on the registration screen when the STEP button is pressed, and
wherein the screen control part is configured to terminate the editing of the condition and change the registration screen into the abnormality item selection screen when the EDIT button is pressed.

2. A method of determining an abnormality of a plurality of substrate processing apparatuses executed in a group management apparatus including
a communication part configured to transmit and receive a monitor data to and from the plurality of substrate processing apparatuses;
a first storage part configured to store the monitor data transmitted through the communication part from the plurality of substrate processing apparatuses;
a second storage part configured to store a file prescribing a condition for determining an abnormality of the plurality of substrate processing apparatuses from the monitor data;
a display part including a manipulation screen for inputting the condition for determining the abnormality using the monitor data stored in the first storage part or the file stored in the second storage part;
a screen control part configured to control the display part to change an abnormality item selection screen displaying a plurality of abnormality items, one of which is to be selected into a registration screen for registering the condition corresponding to at least one of the plurality of abnormality items selected through the abnormality item selection screen; and
a control part configured to determine the abnormality of the plurality of substrate processing apparatuses by reading from the second storage part and analyzing the monitor data stored in the first storage part based on the condition for determining the abnormality the method comprising:
(a) registering the condition in advance; and
(b) obtaining the monitoring data, statistically processing the monitoring data, comparing the monitoring data with predetermined upper and lower limits to determine an abnormality of the monitoring data based on the condition, wherein the step (a) comprises:
- displaying by the control part an ID of the condition for determining the abnormality, one of the plurality of substrate processing apparatuses having the condition for determining the abnormality and an EDIT button for editing the condition for determining the abnormality of on at least the abnormality item selection screen;
- changing by the screen control part the abnormality item selection screen to the registration screen displaying an END EDIT button, a MONITOR DATA button and a STEP button when the EDIT button displayed on the abnormality item selection screen is pressed;
- displaying by the control part a link table linking an abstract name and a channel number of the monitor data for each of the plurality of substrate processing apparatus when the MONITOR DATA button displayed on the registration screen is pressed to edit the monitor data referred to on the registration screen in case of the abnormality;
- registering by the control part a step indicated as the abstract name for each of the plurality of substrate processing apparatuses and a step number for a step name on the registration screen when the STEP button is pressed; and
- terminating by the screen control part an editing of the condition and changing the registration screen into the abnormality item selection screen when the EDIT button is pressed.

3. A group management apparatus comprising: a communication part configured to
- transmit and receive a monitor data to and from a plurality of substrate processing apparatuses;
- a first storage part configured to store the monitor data transmitted through the communication part from the plurality of substrate processing apparatuses;
- a second storage part configured to store a file prescribing a condition for determining an abnormality of the plurality of substrate processing apparatuses from the monitor data;
- a display part including a manipulation screen for inputting the condition for determining the abnormality using the monitor data stored in the first storage part or the file stored in the second storage part;
- a screen control part configured to control the display part to change an abnormality item selection screen displaying a plurality of abnormality items, one of which is to be selected into a registration screen for registering the condition corresponding to at least one of the plurality of abnormality items selected through the abnormality selection screen; and
- a control part configured to determine the abnormality of the plurality of substrate processing apparatuses by reading from the second storage part and analyzing the monitor data stored in the first storage part based on the condition for determining the abnormality, wherein the control part is configured to display: an ID of the condition for determining the abnormality, one of the plurality of substrate processing apparatuses having the condition for determining the abnormality and an EDIT button for editing the condition for determining the abnormality at least on the abnormality item selection screen; and is configured to perform an editing of the condition for determining the abnormality on the manipulation screen when the EDIT button is pressed with the condition for determining the abnormality selected, wherein the screen control part is configured to control the display part to change the abnormality item selection screen to the registration screen displaying and END EDIT button, a MONITOR DATA button and a STEP button when the EDIT button displayed on the abnormality item selection screen is pressed, wherein the control part is configured to allow an editing of the monitor data referred to on the registration screen in case of the abnormality by displaying a link table linking an abstract name and a channel number of the monitor data for each of the plurality of substrate processing apparatuses when the MONITOR DATA button displayed on the registration screen is pressed, and is configured to allow a registration of a step indicated as the abstract name for each of the plurality of substrate processing apparatuses and a step number for a step name on the registration screen when the STEP button is pressed, and wherein the screen control part is configured to terminate the editing of the condition and change the registration screen into the abnormality item selection screen when the EDIT button is pressed.

4. The group management apparatus of claim 3, wherein the condition includes an intended apparatus, an intended recipe, a step of the intended recipe, an intended period, an intended representative value and an intended analytical method.

5. The group management apparatus of claim 3, wherein the plurality of abnormality items includes a pressure abnormality during a formation of a film, an abnormality at constant temperature, an abnormality during temperature decrease, an abnormality during a formation of film, a temperature recover abnormality during an elevation of boat, an RF abnormality during a formation of a film and an operation delay tendency of E shaft.

6. The group management apparatus of claim 3, wherein the ID of the condition and the one of the plurality of substrate processing apparatuses having the condition for determining the abnormality are displayed on the abnormality item selection screen.

7. The group management apparatus of claim 3, wherein an ADD button for registering a new condition for determining the abnormality and a DELETE button for deleting the condition for determining the abnormality are displayed on the registration screen.

8. The group management apparatus of claim 3, wherein a set item set according to an abnormality item and a set value thereof are displayed in the registration screen.

9. The group management apparatus of claim 3, further comprising: a server and a display terminal, wherein the display terminal is connected to the plurality of substrate processing apparatuses via LAN or Internet.

* * * * *